United States Patent Office 2,877,256
Patented Mar. 10, 1959

2,877,256
TRISILOXANES

Harold A. Clark and Loren A. Haluska, Midland, Mich., assignors to Dow Corning Corporation, Midland, Mich., a corporation of Michigan No Drawing. Application November 29, 1956
Serial No. 624,979

3 Claims. (Cl. 260—448.2)

This invention relates to novel siloxanes containing silicon bonded hydrogen.

It is the object of this invention to provide novel compositions of matter which are useful as curing agents for phenylvinylsiloxane solventless resins. These resins are more fully described in the copending application of Harold A. Clark, Serial No. 624,975, entitled "Solventless Siloxane Resins," filed concurrently herewith.

This invention relates to siloxanes of the formula

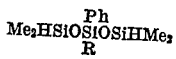

in which R is methyl or phenyl.

The above compounds may be prepared by cohydrolyzing dimethylchlorosilane with phenylmethyldichlorosilane or diphenyldichlorosilane by reacting a mixture of these chlorosilanes with water and thereafter washing the hydrolyzate until it is neutral and recovering the desired products by distillation.

The products of this invention are compatible with phenylvinylsiloxane casting resins. Consequently, they can be used as curing agents when employed in conjunction with platinum catalysts as is more fully described in the aforesaid Clark application.

The following examples are illustrative of this invention.

*Example 1*

A mixture of 2839 g. of methyldichlorosilane and 1911 g. of phenylmethyldichlorosilane was added with agitation to an excess of water. The liquid hydrolyzate was washed until neutral and the product was distilled to give 1866 g. of

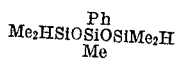

This compound had a boiling point of 88° C. at 6 mm., a specific gravity at 25° C. of .923 and a refractive index at 25° C. of 1.4471.

*Example 2*

360 ml. of water were added slowly with cooling and agitation to a mixture of 506 g. of diphenyldichlorosilane and 568 g. of dimethylchlorosilane. The hydrolyzate was washed free of acid and the product distilled to give the compound

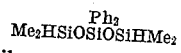

This compound boils at 137° C. at 2.8 mm. and has a refractive index at 25° C. of 1.5000.

That which is claimed is:

1. A composition of the formula

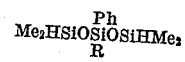

in which R is selected from the group consisting of methyl and phenyl radicals.

2. A composition of the formula

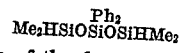

3. A composition of the formula

References Cited in the file of this patent
UNITED STATES PATENTS 2,547,678    Wilcock et al. _____ Apr. 3, 1951